United States Patent
Kadoya

(10) Patent No.: US 10,862,292 B2
(45) Date of Patent: Dec. 8, 2020

(54) VEHICLE CONTROL DEVICE

(71) Applicant: HITACHI AUTOMOTIVE SYSTEMS, LTD., Hitachinaka (JP)

(72) Inventor: Kiyoomi Kadoya, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 311 days.

(21) Appl. No.: 15/781,323

(22) PCT Filed: Oct. 26, 2016

(86) PCT No.: PCT/JP2016/081656
§ 371 (c)(1),
(2) Date: Jun. 4, 2018

(87) PCT Pub. No.: WO2017/104270
PCT Pub. Date: Jun. 22, 2017

(65) Prior Publication Data
US 2018/0358798 A1      Dec. 13, 2018

(30) Foreign Application Priority Data
Dec. 15, 2015   (JP) .................. 2015-243730

(51) Int. Cl.
*H02H 3/05*      (2006.01)
*H02J 7/00*      (2006.01)
(Continued)

(52) U.S. Cl.
CPC .............. *H02H 3/05* (2013.01); *B60R 16/02* (2013.01); *H02H 1/06* (2013.01); *H02H 3/044* (2013.01);
(Continued)

(58) Field of Classification Search
CPC ............ H02H 3/05; H02H 1/06; H02H 3/044; H02H 11/002; B60R 16/02; H02J 1/14; H02J 7/0029; H02J 7/345
See application file for complete search history.

(56) References Cited

U.S. PATENT DOCUMENTS

| | | | |
|---|---|---|---|
| 2012/0161681 A1 | 6/2012 | Kuroda | |
| 2015/0035539 A1 | 2/2015 | Wakida et al. | |
| 2016/0268903 A1* | 9/2016 | Miyaki | ................ H02M 3/158 |

FOREIGN PATENT DOCUMENTS

| | | |
|---|---|---|
| JP | 2007-145208 A | 6/2007 |
| JP | 2012-139021 A | 7/2012 |

(Continued)

OTHER PUBLICATIONS

International Search Report with English Translation and Written Opinion issued in corresponding application No. PCT/JP2016/081656 dated Feb. 7, 2017.

*Primary Examiner* — Daniel Kessie
(74) *Attorney, Agent, or Firm* — Foley & Lardner LLP

(57) ABSTRACT

There is provided a vehicle control device that allows high-speed diagnosis of a current breaker while assuring the accuracy of the current flowing to a load during the operation of the load. A smoothing capacitor (8) is connected in parallel to linear solenoid valves (13a and 13b). A current breaker (3a) and a reverse connection protector (4a) are connected in series from a battery (2) to a first connection point (P1) between the linear solenoid valves (13a and 13b) and the smoothing capacitor (8). A discharge unit (DU) is connected to a second connection point (P2) between the breaker (3a) and the reverse connection protector (4a) to discharge electric charge from the second connection point (P2).

6 Claims, 5 Drawing Sheets

(51) Int. Cl.
  *H02H 3/04*    (2006.01)
  *H02H 11/00*   (2006.01)
  *B60R 16/02*   (2006.01)
  *H02H 1/06*    (2006.01)
  *H02J 1/14*    (2006.01)
  *H02J 7/34*    (2006.01)

(52) U.S. Cl.
  CPC ............ *H02H 11/002* (2013.01); *H02J 1/14* (2013.01); *H02J 7/0029* (2013.01); *H02J 7/345* (2013.01)

(56) References Cited

FOREIGN PATENT DOCUMENTS

| | | |
|---|---|---|
| JP | 2015-033233 A | 2/2015 |
| JP | 2015-047035 A | 3/2015 |

\* cited by examiner (COMPARATIVE EXAMPLE)

VEHICLE CONTROL DEVICE

TECHNICAL FIELD

The present invention relates to a vehicle control device.

BACKGROUND ART

In recent years, greater importance has been placed on diagnosis of the main function and safety device of a control unit (C/U) in conformity with Automotive Functional Safety Standard (ISO26262). There has been employed a method for the real-time diagnosis of the main function such as a dual system. However, it is difficult to diagnose in real time the safety device for safely stopping the main function. This is because operating the safety device halts the main function.

As for the real-time diagnosis of the safety device, there is known a power shutoff device that is capable of detecting an off failure of a second power relay during the operation of a load circuit (for example, refer to PTL 1). PTL 1 describes that "the first relay driving unit is instructed to switch off the first power relay for a short time during the operation of the inverter, and while the first power relay is off, an off failure of the second power relay is detected based on a change in the intermediate voltage.

CITATION LIST

Patent Literature

PTL 1: JP 2015-47035 A

SUMMARY OF INVENTION

Technical Problem

According to the technique described in PTL 1, a time constant of an intermediate voltage detection unit (30) detecting an intermediate voltage (V1) between a first power relay (21) and a second power relay (22) is set to about 100 us (micro seconds) to implement the detection of an off failure of the second power relay within a voltage stop time of 15 ms permitted by the power steering system.

The use of this method makes it possible to diagnose the power steering system within 15 ms without problem. In some other systems, however, the accuracy of current flowing to the load must be assured even during the diagnosis, which requires higher-speed diagnosis. The technique described in PTL 1 cannot be applied to such a case.

An object of the present invention is to provide a vehicle control device that allows high-speed diagnosis of a current breaker while assuring the accuracy of the current flowing to a load during the operation of the load.

Solution to Problem

To attain the foregoing object, the present invention includes a smoothing capacitor that is connected in parallel to a load, a first breaker and a second breaker that are connected in series from a power source unit to a first connection point between the load and the smoothing capacitor to shut off current, and a discharge unit that is connected to a second connection point between the first breaker and the second breaker to discharge electric charge from the second connection point.

Advantageous Effects of Invention

According to the present invention, it is possible to allow high-speed diagnosis of the current breaker while assuring the accuracy of the current flowing to the load during the operation of the load. Other issues, configurations, and advantageous effects will be clarified in the following description of embodiments.

DESCRIPTION OF EMBODIMENTS

The configurations and operations of automatic transmission (AT) C/Us as the vehicle control devices according to first and second embodiments of the present invention will be described below with reference to the drawings. Identical reference signs represent identical components in all the drawings.

Comparative Example

First, the reason why the real-time diagnosis of the safety device is difficult will be described below taking the AT C/U as an example. In the case of the AT C/U, the main function refers to a driving circuit that controls the current flowing to a linear solenoid valve for speed control, and the safety device refers to a power shutoff circuit that shuts off the current to the linear solenoid valve.

Figure 3:
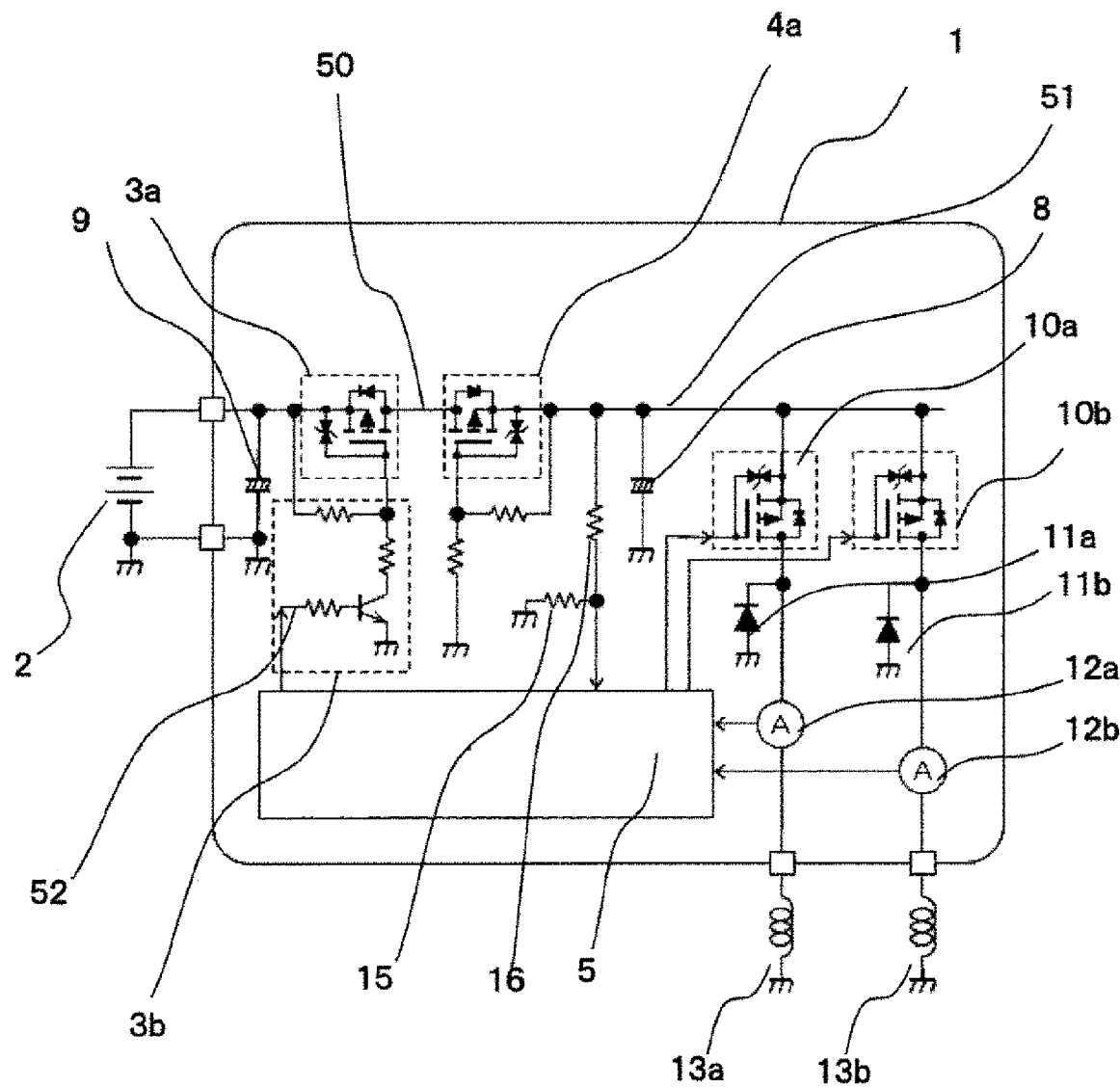
FIG. 3 is a configuration diagram of a vehicle control device according to a comparative example.

FIG. 3 illustrates a circuit configuration of the AT C/U as the comparative example.

The AT C/U (1) contains a plurality of driving circuits (10, 11, and 12) with a battery (2) as a power source to control the current flowing to linear solenoid valves (13). The current to the linear solenoid valves (13) is controlled through a current feedback control by the program implemented in a microcomputer (5).

Implemented upstream of the driving circuits (10, 11, and 12) are a breaker (3a) that shuts off the current flowing from the battery to the linear solenoid valves, a breaker driving circuit (3b) that controls on/off state of the breaker (3a) from the microcomputer, a reverse connection protector (4a) that shuts off the current flowing from the ground side of the C/U (1) to the positive side of the battery when the battery is reversely connected, a smoothing capacitor (8) that stabilizes an upstream power source (51) for the driving circuits (10, 11, and 12), and voltage monitor circuits (15 and 16) that monitor the voltage of the upstream power source (51) for the driving circuits.

The breaker (3a) is in the on state under the normal control. The reverse connection protector (4a) is always in the on state when powered by the circuit configuration.

Figure 4:
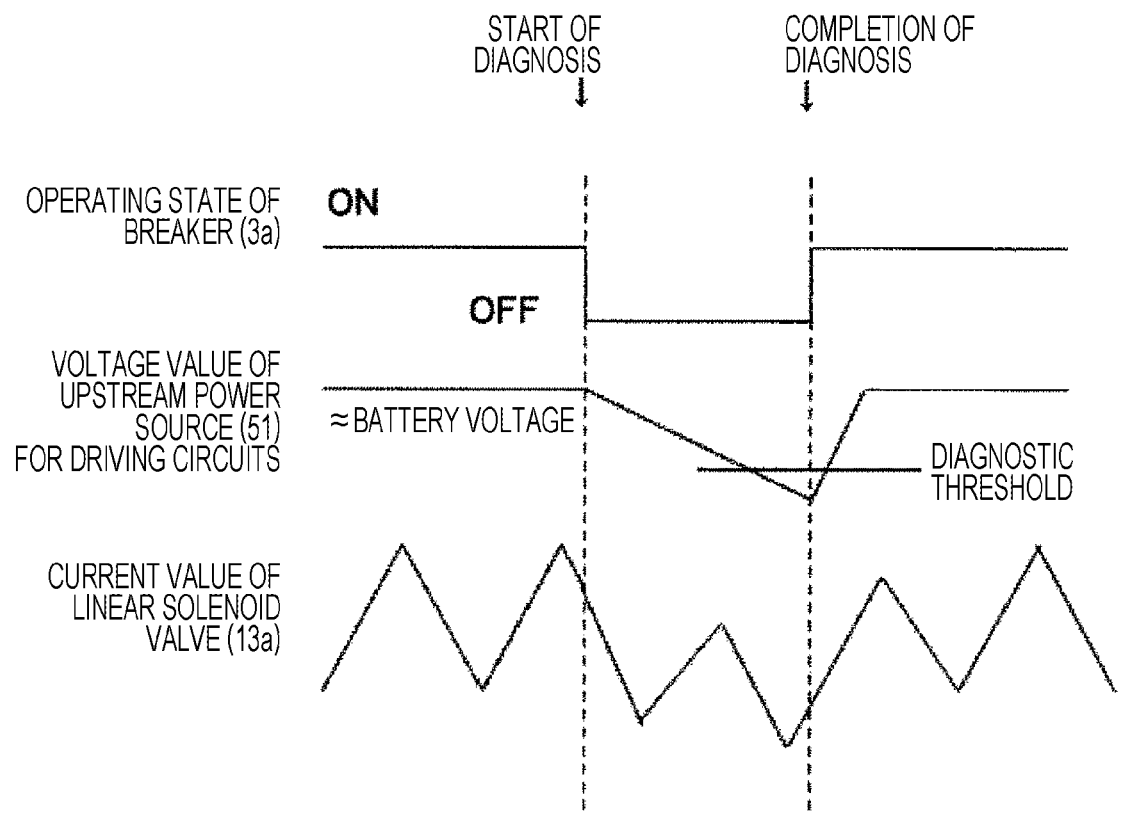
FIG. 4 is a diagnostic timing chart of the vehicle control device according to the comparative example.

To perform the diagnosis of the breaker (3a), as illustrated in FIG. 4, the breaker (3a) is turned from on to off and the voltage value of the upstream power source (51) for the driving circuits are monitored by the microcomputer (5) through the voltage monitor circuits (15 and 16). When the voltage decreases to a certain diagnostic threshold, it can be diagnosed that the breaker (3a) is normally turned off. If the breaker (3a) fails in the on state, the voltage of the upstream power source (51) for the driving circuits does not decrease but keeps the battery voltage value, thereby making it possible to diagnose the abnormality of the breaker (3a).

In the case of using this diagnostic method, it takes time to complete the diagnosis with a decrease in voltage because the upstream power source (51) for the driving circuits has the smoothing capacitor (8), the time for decreasing the voltage of the upstream power source (51) for the driving circuit varies depending on the current to the linear solenoid valves, and the current to the linear solenoid valves fluctuates with a voltage decrease in the upstream power source (51) for the driving circuits to disable assurance of the accuracy of the control current during the diagnosis. Due to these issues, it is difficult to perform real-time diagnosis under the normal control.

Accordingly, the diagnosis of the breaker (3a) is performed before shifting to the actual control after the activation of the C/U or before terminating the actual control and shutting down the power source for the C/U (1). The real-time diagnosis of the breaker (3a) is not performed.

Meanwhile, there has been for sure increasing demand for real-time diagnosis on the vehicle system side in recent years. In particular, the safety device installed in the C/Us of vehicle power train system, steering system, and brake system is an important component that is responsible for the safety of the vehicle. Accordingly, it is necessary to attain the real-time diagnosis of the safety device as swiftly as possible.

First Embodiment

Figure 1:
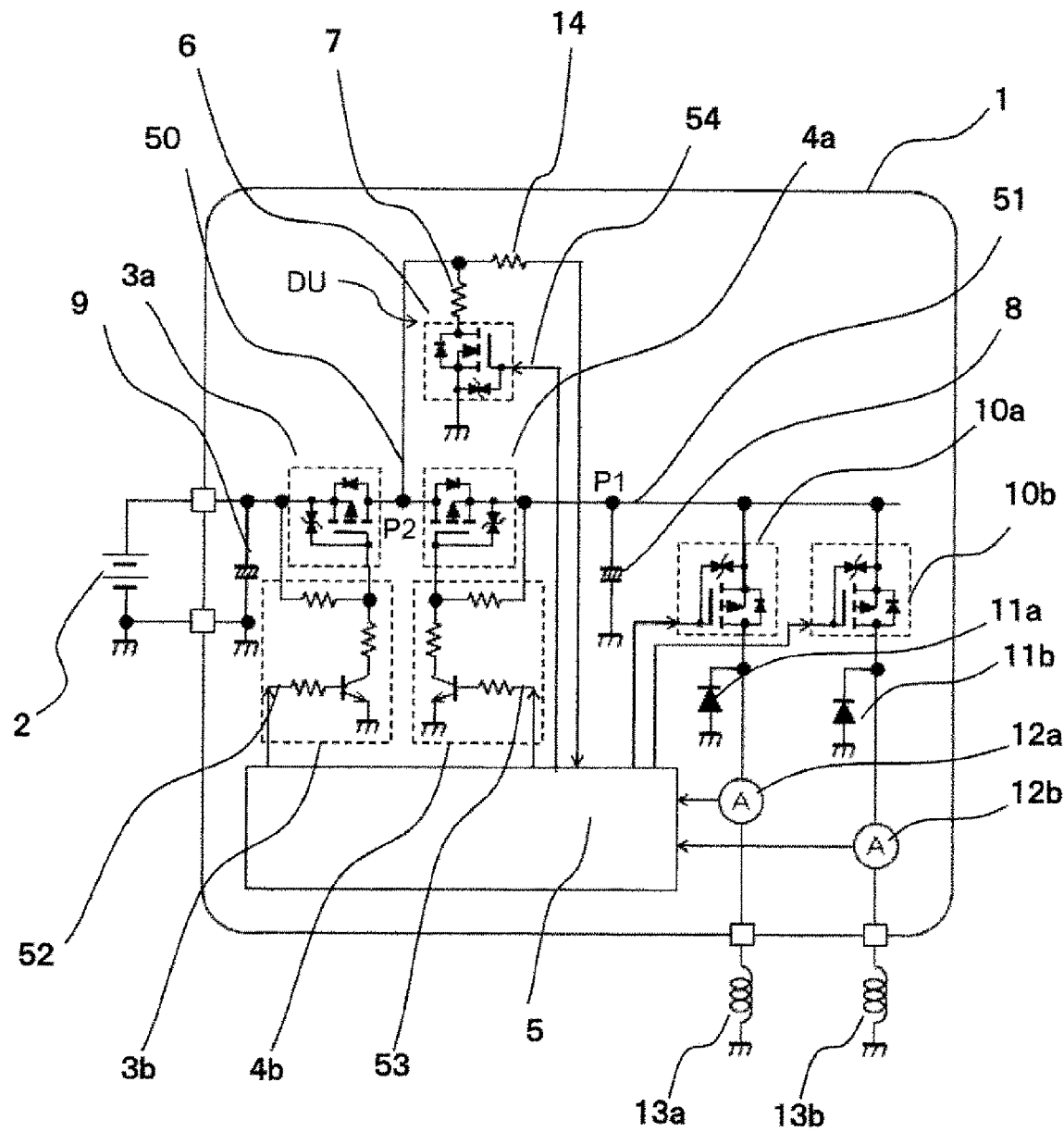
FIG. 1 is a configuration diagram of a vehicle control device according to a first embodiment of the present invention.

FIG. 1 is a configuration diagram of a C/U according to a first embodiment of the present invention. The components with reference signs will be described below with reference to FIG. 1.

An AT C/U (1) contains a plurality of driving circuits (10a, 10b, 11a, 11b, 12a, and 12b) with a battery (2) as a power source to control the current flowing to linear solenoid valves (13a and 13b). The current to the linear solenoid valves (13) is controlled through a current feedback control by the program implemented in a microcomputer (5).

The driving circuits include PWM switching elements (10a and 10b) that receive signals from the microcomputer (5) and switch the same by PWM, freewheel diodes (11a and 11b) that freewheel the current when the PWM switching elements (10a and 10b) are off, and current detection units (12a and 12b) that detect the current to the linear solenoid valves and pass signals to the microcomputer (5). The numbers of the driving circuits and the linear solenoid valves (13) vary depending on applications but are more than one in general.

Implemented upstream of the driving circuits are a breaker (3a) that shuts off the current flowing from the battery (2) to the linear solenoid valves (13a and 13b), a breaker driving circuit (3b) that controls on/off state of the breaker (3a) from the microcomputer, a reverse connection protector (4a) that shuts off a path of current flowing from the ground side of the C/U (1) through the driving circuits (10a, 10b, 11a, 11b, 12a, and 12b) and the breaker (3a) to the positive side of the battery when the battery (2) is reversely connected, and a smoothing capacitor (8) that stabilizes an upstream power source (51) for the driving circuits (10a, 10b, 11a, 11b, 12a, and 12b).

In other words, the smoothing capacitor (8) is connected in parallel to the linear solenoid valves (loads: 13a and 13b). The current breaker (first breaker 3a) and the reverse connection protector (second breaker 4a) are connected in series from the battery (power source unit 2) to the first connection point (P1) between the linear solenoid valves (13a and 13b) and the smoothing capacitor (8).

To attain high-speed diagnosis, the breaker (3a) and the reverse connection protector (4a) are preferably semiconductor switching elements such as field effect transistors (FETs) and intelligent power devices (IPDs).

Implemented at an intermediate point (50) between the breaker (3a) and the reverse connection protector (4a) are a discharge switching element (6) and a discharge resistor (7) for receiving signals from the microcomputer (5) and discharging electric charge from the intermediate point (50). A current-limiting resistor (14) is implemented between the intermediate point (50) and an input unit of the microcomputer (5). The input unit of the microcomputer (5) is assumed here to be a port input for determining Hi and Lo.

The discharge switching element (6) and the discharge resistor (7) constitute a discharge unit (DU). The discharge unit (DU) is connected to the second connection point (P2) between the breaker (first breaker 3a) and the reverse connection protector (second breaker 4a) to discharge electric charge from the second connection point (P2).

The discharge unit (DU) has the switching element (6) that turns on and off the connection between the second connection point (P2) and the ground. The discharge unit (DU) has the resistor (7) that connects the second connection point (P2) and the ground.

The discharge switching element (6) is preferably a semiconductor switching element such as an FET or an IPD for achieving high-speed diagnosis, more preferably an IPD with an overcurrent protective function.

Next, a diagnosis method in the first embodiment of the present invention will be described with reference to FIG. 2.

Under the normal control of the C/U (1), the breaker (3a) and the reverse connection protector (4a) are turned on to supply power to the driving circuits. At that time, the discharge switching element (6) is in the off state, and the current to the linear solenoid valves is controlled under the voltage of the intermediate point (50) kept at around the voltage of the battery (2).

At the start of the diagnosis, the microcomputer (5) outputs an OFF signal to a breaker control signal (52) and a reverse connection protector control signal (53). Upon receipt of the off signal, the breaker driving circuit (3b) and the reverse connection protector driving circuit (4b) receive turn off the breaker (3a) and the reverse connection protector (4a). This blocks the path of current from the battery (2) to the intermediate point (50) and the path of current from the smoothing capacitor (8) to the intermediate point (50), thereby to shut off the paths of current to the intermediate point (50).

The microcomputer (5) further outputs an ON signal to a discharge switching element control signal (54). Upon receipt of the signal, the discharge switching element (6) turns on to discharge the electric charge accumulated in the line of the intermediate point (50) via the discharge resistor (7) to change instantaneously the voltage of the intermediate point (50) from the equivalent of the voltage of the battery (2) to about zero volt.

In other words, during the operation of the linear solenoid valves (loads 13a and 13b), the microcomputer (5) serves as a device control unit that turns off the breaker (first breaker 3a) and the reverse connection protector (second breaker 4a) and turns on the discharge unit (DU). While the breaker (first breaker 3a) and the reverse connection protector (second breaker 4a) are turned off and the discharge unit (DU) is turned on, the smoothing capacitor (8) supplies power to the linear solenoid valves (loads 13a and 13b).

At that time, the electric discharge accumulated in the intermediate point (50) refers mainly to a drain-source capacity, a drain-gate capacity, and a gate-source capacity of the FETs or IPDs as the breaker (3a) and the reverse connection protector (4a). These capacities are greater with the FETs or IPDs corresponding to higher current. Accordingly, what is necessary to change the voltage of the intermediate point (50) to about zero volt at a high speed is the discharge switching element (6) in the embodiment of the present invention is necessary, not the circuit configuration with a time constant connected to the intermediate voltage (V1) described in PTL 1. Regarding "changing to about zero volt at a high speed", the "high speed" refers to 10 us or less by time.

According to the technique described in PTL 1, the electric charge is discharged from the intermediate voltage (V1) via the resistor and the capacitor. Thus, a time constant of about 100 us is a limit value in a practical use range. To further decrease the time constant, it is necessary to discharge the electric charge with a smaller resistance value. However, decreasing the resistance value between the intermediate voltage (V1) and the GND is not a realistic idea because this would significantly loss power in a layer short-circuit state between the power source and the GND.

In the embodiment of the present invention, it is possible to discharge the electric charge from the intermediate point (50) and change the voltage to about zero volt at a higher speed by controlling the discharge switching element (6) to change the impedance between the intermediate point (50) and the GND. In other words, the switching element (6) changes the impedance between the second connection point (P2) and the ground.

When the intermediate point (50) reaches the equivalent of zero volt, the voltage input into the microcomputer (5) via the current-limiting resistor (14) becomes zero volt at the same time. The microcomputer (5) can detect a voltage value equal to or less than the diagnostic threshold voltage to determine that the breaker (3a) is normally turned off.

To use an AD convertor built in the microcomputer (5) as the input unit of the microcomputer (5) for monitoring the voltage value, it is necessary to select and set a high-speed AD convertor to satisfy a presumed diagnosis time of 10 us or less. The use of such an AD converter provides the advantage that the diagnosis threshold voltage described in FIG. 2 can be finely set by the microcomputer (5).

Figure 2:
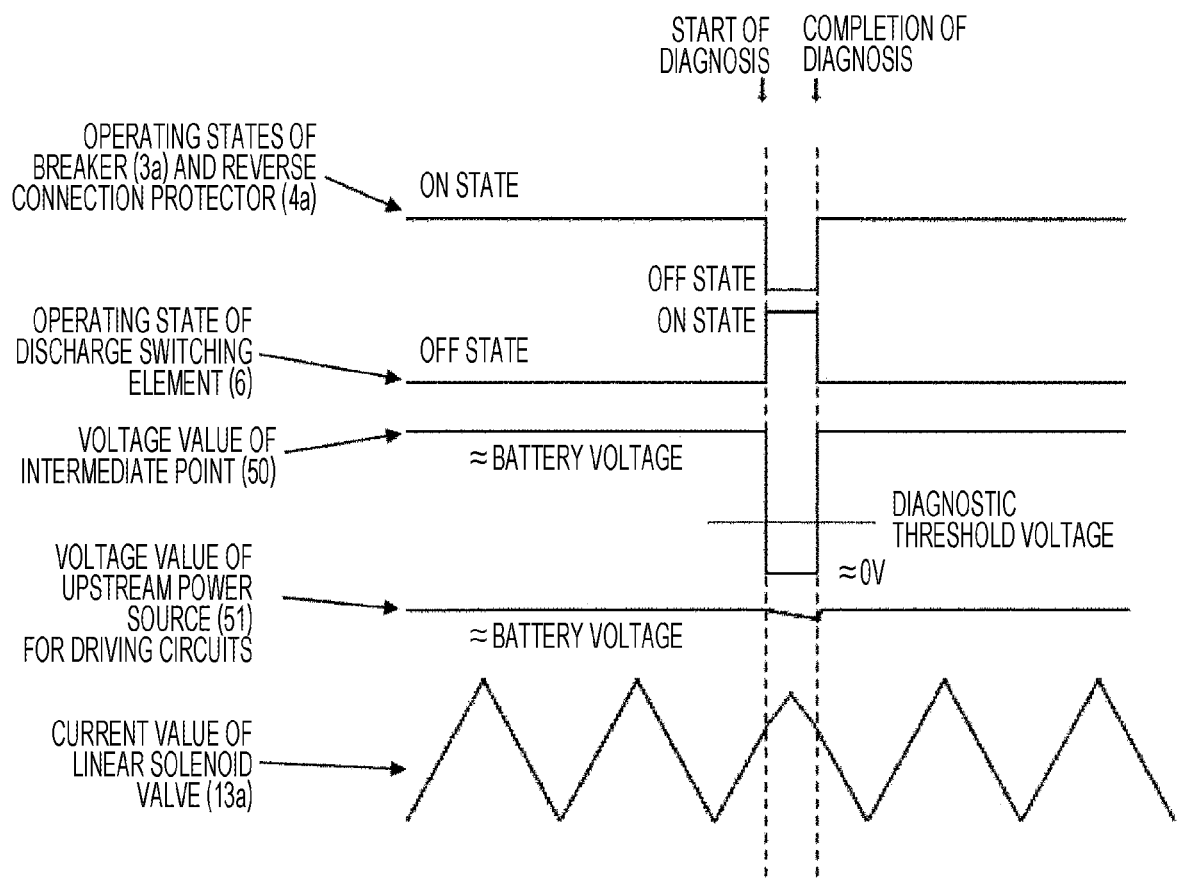
FIG. 2 is a diagnostic timing chart of the vehicle control device according to the first embodiment of the present invention.

Meanwhile, the use of a general-purpose port input for detecting instantly Hi/Lo as the input unit of the microcomputer (5) makes it possible to determine Hi/Lo within 1 us or less, but the diagnosis threshold voltage described in FIG. 2 needs to be set to the voltage value predetermined by the microcomputer (5). Nevertheless, the general-purpose port is capable of Hi/Lo determination at a very high speed as compared to the AD convertor. Accordingly, it is preferred to use the general-purpose port in the embodiment of the present invention.

In this manner, the microcomputer (5) serves as a voltage measurement unit that measures the voltage of the second connection point (P2). The microcomputer (5) also serves as a diagnosis unit that, when the voltage of the second connection point (P2) measured during the period of time in which the breaker (first breaker 3a) and the reverse connection protector (second breaker 4a) are turned off and the discharge unit (DU) is turned on exceeds the threshold, diagnoses the breaker (3a) as being failed.

When diagnosing the breaker (3a) as being failed, the microcomputer (5) may output an indication of failure of the breaker (3a) to an external device such as a display device.

The presence of the discharge resistor (7) is important in discharging the electric charge from the intermediate point (50) and performing a diagnosis under the voltage of the intermediate point (50).

The discharge resistor (7) plays the role of preventing damaging overcurrent to the discharge switching element (6) as an FET or IPD at the time of discharging.

When the breaker (3a) is in on-failure at the start of diagnosis, it is important to set the resistance value of the discharge resistor (7) such that, when the breaker (3a) is in on-failure, the voltage of the intermediate point (50) is higher than the diagnostic threshold voltage, because the voltage of the intermediate point (50) is determined by the partial pressures of the on resistance value of the breaker (3a) and the discharge resistor (7).

In this case, there is a short-circuit between the power source and the GND during the diagnosis time. Accordingly, it is important to select the discharge resistor (7) and the discharge switching element (6) that can withstand an instantaneous short-circuit current. It is also preferred to select an IPD with an overcurrent protective function as the discharge switching element (6).

Accordingly, after diagnosing that the breaker (3a) is normally turned off, the discharge switching element (6) is turned off and the breaker (3a) and the reverse connection protector (4a) are turned on, thereby completing the diagnosis. During the diagnosis of the breaker (3a), the current to the linear solenoid valves (13) is controlled. However, the diagnosis time is as short as 10 us or less, and there hardly occurs a drop in the voltage of the upstream power source (51) for the driving circuits with no influence on the accuracy of the control current. It is here assumed that the drop in the voltage of the upstream power source for the driving circuits is 0.1 V or less, and the accuracy of the control current to the linear solenoid valves is ±10 mA.

The voltage of the upstream power source (51) for the driving circuits is a demand for the accuracy of the current to the loads of the linear solenoid valves (13). It is important to reduce fluctuation in the voltage during the diagnosis to exert no influence on the accuracy of the control current to the linear solenoid valves (13). It is possible to reduce the fluctuation in the upstream power source (51) for the driving circuits by increasing the capacity of the smoothing capacitor (8) or performing the diagnosis of the breaker (3a) in a shorter time.

In the embodiment of the present invention, the diagnosis can be performed in a short time, which is effective in the case where the capacity of the smoothing capacitor (8) cannot be made further larger. In addition, the diagnosis timing can be controlled by the microcomputer (5), which provides the advantage that it is easy to contemplate shortening the diagnosis time.

The timing for diagnosis of the breaker (3a) is preferably set such that the diagnosis exerts minimum influence on the actual control. In the embodiment, the diagnosis is preferably performed on an occasion when the sum of the control current to the plurality of linear solenoid valves (13) is smallest. This is because, as the sum current to the loads is smaller, the drop in the voltage of the upstream power source (51) for the driving circuits at the time of diagnosis is smaller.

In other words, at the timing when the current to the loads is smallest, the microcomputer (5) serves as a device control unit that turns off the breaker (first breaker 3*a*) and the reverse connection protector (second breaker 4*a*) and turns on the discharge unit (DU).

From another viewpoint, the diagnosis of the breaker (3*a*) may be performed once within the exposure time from the occurrence of a failure of an element to a hazardous event of the vehicle, for example, at intervals of 100 ms, to assure the safety in the use application. The exposure time here is assumed to be the fault tolerant time interval (FTTI) used under ISO26262.

A power input unit smoothing capacitor (9) plays the role of suppressing fluctuation in the current flowing to the power line at the time of turning on/off the breaker (3*a*), which can be expected to be effective in suppressing noise emission. In the embodiment of the present invention, in particular, this capacitor is important in suppressing noise emission because the capacitor switches the breaker (3*a*) and the reverse connection protector (4*a*) at a high speed for achieving high-speed diagnosis of the breaker (3*a*). To stabilize the power source, a large-capacity aluminum electrolysis capacitor is mainly used. In addition, a ceramic capacitor small in equivalent series resistance and equivalent series inductance may be implemented in parallel to the aluminum electrolysis capacitor.

As described above, according to the embodiment, it is possible to diagnose a current breaker at a high speed while assuring the accuracy of the current flowing to the loads during the operation of the loads.

Second Embodiment

Figure 5:
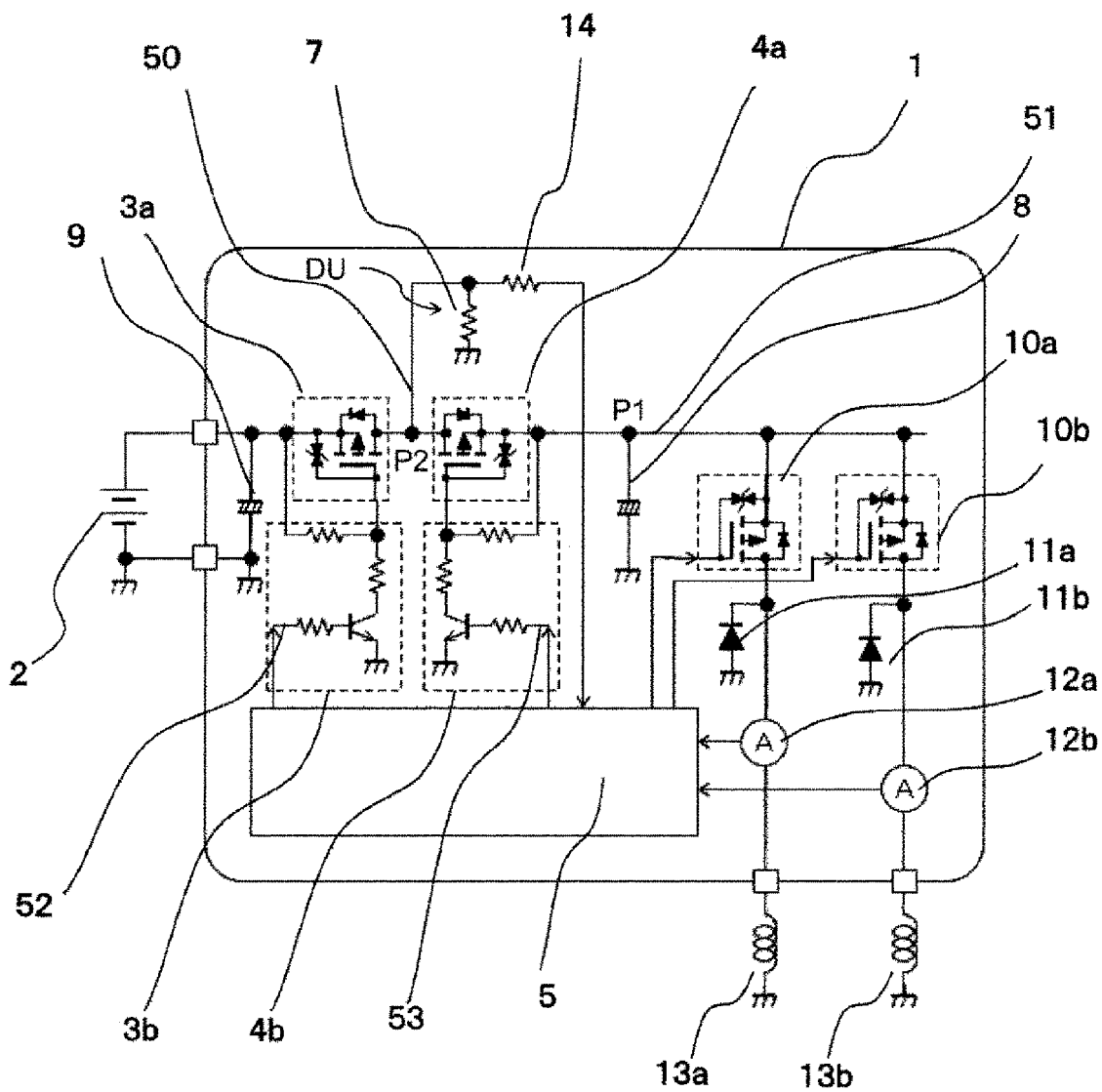
FIG. 5 is a configuration diagram of a vehicle control device according to a second embodiment of the present invention.

FIG. 5 is a configuration diagram of a C/U according to a second embodiment of the present invention. The second embodiment is different from the first embodiment in that the discharge switching element (6) is non-existent and only the discharge resistor (7) is implemented. The first embodiment performs active discharge under the control of the discharge switching element (6) and the discharge resistor (7), whereas the second embodiment is assumed on passive discharge only with the discharge resistor (7).

The diagnostic sequence is the same as that in the first embodiment. The electric charge can be discharged from the intermediate point (50) as quickly as possible by setting the resistance value of the discharge resistor (7) to be lower to the extent that the discharge resistor (7) can withstand heat generation resulting from power consumption. However, without the discharge switching element (6) unlike in the first embodiment, it is not possible to discharge the electric charge from the intermediate point (50) as quickly as the first embodiment. As a result, the diagnosis time of the breaker (3*a*) is longer than that in the first embodiment.

Nevertheless, the circuit configuration in the second embodiment illustrated in FIG. 5 allows the electric charge to be discharged more quickly than the low-pass filter circuit consisting of the resistor and the capacitor for monitoring the voltage of the intermediate potential (V1) as described in PTL 1. Accordingly, the second embodiment allows higher-speed diagnosis of the breaker (3*a*) than the technique described in PTL 1.

The present invention is not limited to the foregoing embodiments but includes various modification examples. For example, the foregoing embodiments have been described in detail so far for ease of comprehension of the present invention. However, the present invention is not limited to the embodiments including all the components described above. Some of the components in one embodiment may be replaced by components in another embodiment. In addition, components in one embodiment may be added to components in another embodiment. Some of components in the foregoing embodiments may be added, deleted, or replaced by other components.

The foregoing embodiments have been described taking an AT C/U. However, the C/U may not be for AT.

Some or all of the foregoing components and functions may be implemented hardware-wise by designing an integrated circuit, for example. The foregoing components and functions may be implemented software-wise by a processor interpreting and executing the programs for performing these functions. The information in the programs, tables, and files for performing the functions may be stored in recording devices such as memories, hard discs, solid state drives (SSDs), or recording media such as IC cards, SD cards, and DVDs.

Embodiments of the present invention may be configured as follows:

(1) A vehicle control device including:

a power shutoff unit (3*a*) that is interposed between a power source (2) and a load (13);

a smoothing capacitor (8) that is interposed between the power shutoff unit (3*a*) and the load (13);

a current shutoff unit (4*a*) that is interposed between the power shutoff unit (3*a*) and the smoothing capacitor (8) and is capable of shutting off current flowing from the smoothing capacitor (8) to the power shutoff unit (3*a*);

a measurement unit (5 and 14) that measures intermediate voltage between the power shutoff unit (3*a*) and the current shutoff unit (4*a*);

a discharge unit (6 and 7) that discharges electric charge from between the power shutoff unit (3*a*) and the current shutoff unit (4*a*); and a discharge control unit (5 and 54) that controls the discharge unit (6 and 7).

(2) The vehicle control device according to (1), wherein, at measurement of the intermediate voltage, the discharge control unit controls the discharge unit to discharge the electric charge while the power source and the current are shut off by the power source shutoff unit and the current shutoff unit during the operation of the load.

(3) The vehicle control device according to (1), wherein the discharge unit includes a switch element that controls the connection state of a point between the power shutoff unit and the current shutoff unit to a ground.

(4) A vehicle control device including a power shutoff unit that is interposed between a power source and a load;

a smoothing capacitor that is interposed between the power shutoff unit and the load;

a current shutoff unit that is interposed between the power shutoff unit and the smoothing capacitor and is capable of shutting off current flowing from the smoothing capacitor to the power shutoff unit; and a measurement unit that measures intermediate voltage between the power shutoff unit and the current shutoff unit, wherein the measurement unit measures the intermediate voltage to diagnose the power shutoff unit while the power source and the current are shut off by the power shutoff unit and the current shutoff unit during the operation of the load.

(5) The vehicle control device according to any one of (1) to (4), wherein the smoothing capacitor supplies power to the load at the measurement of the intermediate voltage.

(6) A vehicle control device comprising a semiconductor switch element with an overcurrent protective function as a switch element used in the discharge unit.

REFERENCE SIGNS LIST

1 C/U
2 battery
3a breaker
3b breaker driving circuit
4a reverse connection protector
4b reverse connection protector driving circuit
5 microcomputer
6 discharge switching element
7 discharge resistor
8 smoothing capacitor
9 power source input unit smoothing capacitor
10a PWM switching element
10b PWM switching element
11a freewheel diode
11b freewheel diode
12a current detection unit
12b current detection unit
13a linear solenoid valve
13b linear solenoid valve
14 current-limiting resistor
15 voltage monitor circuit resistor 1
16 voltage monitor circuit resistor 2
50 intermediate point
51 upstream power source for driving circuits
52 breaker control signal
53 reverse connection protector control signal
54 discharge switching element control signal

The invention claimed is:

1. A vehicle control device comprising:
a smoothing capacitor that is connected in parallel to a load;
a first breaker and a second breaker that are connected in series from a power source unit to a first connection point between the load and the smoothing capacitor to shut off current;
a discharge unit that is connected to a second connection point between the first breaker and the second breaker to discharge electric charge from the second connection point; and
a processor configured to:
turn off the first breaker and the second breaker and turn on the discharge unit in a period of time in which the load is operating;
measure a voltage of the second connection point during the period of time in which the first breaker and the second breaker are turned off and the discharge unit is turned on;
compare the measured voltage to a threshold; and
responsive to determining the measured voltage exceeds the threshold, transmit an indication that the first breaker has failed to an external device.

2. The vehicle control device according to claim 1, wherein the discharge unit comprises a switching element configured to turn the connection between the second connection point and the ground on and off.

3. The vehicle control device according to claim 2, wherein the switching element is configured to change the impedance between the second connection point and the ground.

4. The vehicle control device according to claim 1, wherein the discharge unit comprises a resistor that is configured to connect the second connection point and the ground.

5. The vehicle control device according to claim 1, wherein the smoothing capacitor is configured to supply power to the load while the first breaker and the second breaker are turned off and the discharge unit is turned on.

6. The vehicle control device according to claim 1, wherein the processor is configured to turn off the first breaker and the second breaker and turn on the discharge unit at a time in which the current to the load reaches a minimum.

* * * * *